United States Patent Office 3,542,884
Patented Nov. 24, 1970

3,542,884
PROCESS FOR PREPARING FLUORODINITRO COMPOUNDS
Horst G. Adolph, Beltsville, Md., assignor to the United States of America as represented by the Secretary of the Navy
No Drawing. Continuation-in-part of application Ser. No. 387,556, July 31, 1964. This application Jan. 24, 1969, Ser. No. 795,773
Int. Cl. C07c *31/34*
U.S. Cl. 260—633                                 5 Claims

ABSTRACT OF THE DISCLOSURE

Processes for the preparation of 2-fluoro-2,2-dinitroethanol (FDNE) and bis (2-fluoro-2,2-dinitroethyl) formal (FEFO) by reacting fluorotrinitromethane (FTM) with formaldehyde under basic conditions in the presence of a surfactant and a reducing agent to yield FDNE which is extracted with methylene chloride and then reacted with more formaldehyde under strongly acidic conditions to yield FEFO.

The application is a continuation-in-part of copending application Ser. No. 387,556 filed on July 31, 1964, now Pat. No. 3,446,857, and of common assignee herewith.

BACKGROUND OF THE INVENTION

This invention relates generally to the preparation of fluorodinitro compounds and more particularly to an improved method of preparing FDNE and FEFO.

In the copending application Ser. No. 387,556, filed on July 31, 1964, the preparation of FDNE by reacting fluorotrinitromethane with formaldehyde in the presence of a base and a reducing agent is described. This process utilizes aqueous methanol and acetone as organic solvents which must be removed from the reaction mixture before FEFO can be prepared because the solvent interferes with the process which is ordinarily conducted in the absence of a solvent as described in copending application Ser. No. 173,592, filed on Feb. 15, 1962 and of common assignee herewith. In that process, a solvent is not required because the fluorodinitro alcohol, one of the reactants, fulfills the same function as a solvent. In addition, if an alcohol or acetone is used as a solvent undesirable side products would be formed with the formaldehyde such as a formal or acetal. A conventional means for obtaining solvent removal and thus avoiding these difficulties would be vacuum stripping of the solvent but this is a potentially hazardous operation because it involves the handling of a product which is explosive in its neat state.

SUMMARY OF THE INVENTION

Accordingly, an object of this invention is to provide a process for the preparation of FDNE in good yields, which does not require the use of an organic solvent.

Another object of this invention is to provide a process for the preparation of FEFO which avoids the necessity of isolating the intermediate FDNE in a neat state.

Briefly, in accordance with one embodiment of this invention, these and other objects are attained by reacting fluorotrinitromethane with formaldehyde under basic conditions in the presence of a surfactant and a reducing agent to produce FDNE which is extracted with methylene chloride and then reacted with more formaldehyde under strongly acidic conditions to yield FEFO.

DESCRIPTION OF THE PREFERRED EMBODIMENTS

The invention may be understood more clearly by reference to the following examples which are included for purposes of illustration and are not intended to limit the scope of the invention.

EXAMPLE I

Preparation of FDNE

A solution of 5 to 40 g. of sodium p-toluene sulfonate in 450 ml. of water is cooled to 0° C. and 210 ml. of a 30% hydrogen peroxide solution is added. Then, 5 ml. of aqueous solution of 72.5 g. sodium hydroxide in 350 ml. of water is added to this mixture along with 14.85 ml. of a 36% aqueous formaline solution and 250 g. of FTM as the temperature is kept between −5 and 0° C. This is followed by the further addition of the remaining 345 ml. of the aqueous sodium hydroxide solution over a 45 minute period and in the same temperature range. The reaction mixture is then stirred for 15 minutes at 0° C. and acidified by a dropwise addition of dilute sulfuric acid made by pouring 25 ml. of concentrated sulfuric acid on cracked ice. This step is accompanied by a temperature rise of the mixture of approximately 15°. 200 g. of sodium chloride is added and the mixture is extracted with five 300 ml. portions of methylene chloride. The resulting methylene chloride solutions of FDNE is dried over magnesium sulfate and concentrated under reduced pressure and 211 g. of the alcohol (92.6% yield) which is of a purity greater than 95% is obtained.

EXAMPLE II

Preparation of FEFO

The methylene chloride solution described in Example I after being dried over magnesium sulfate and concentrated to 500–750 ml. is reacted with a solution of 20–21 g. p-formaldehyde in 200–250 ml. of concentrated acid for 1–3 hours at room temperature in a similar manner as previously set forth in copending application Ser. No. 173,592 the disclosure of which is now incorporated herein. A yield of 75% FEFO (based on FTM) is obtained. The product has a freezing point of 12–13° and a purity of 95% or better as determined by gas chromatographic analysis.

The compounds of Examples I and II previously have been found to be useful. For example, FDNE may be used as an intermediate for other explosive and propellant materials which are described in copending application Ser. No. 480,258, filed on Aug. 13, 1965 and in U.S. Pat. 3,388,147. FEFO, on the other hand, finds use as a high energy plasticizer for polymeric propellant binders as disclosed in copending application 173,592. Thus, the processes of the invention are concerned with the preparation of compounds which are known to be very useful in the explosive and propellant arts. In addition, the advantage achieved by the invention which avoids the necessity of producing FDNE in the neat state is applicable to the preparation of other compounds besides FEFO, which utilize the same intermediate as mentioned heretofor. Further, the preparation of FDNE, described in Example I, is found to produce the desired product in even better yields and higher purity than that of the parent application, Ser. No. 387,556.

Although the examples contain only sodium p-toluene sulfonate, other surfactants may be used in the practice of this invention. Such surfactants include the anionic, non-ionic and cationic types of surfactants. In particular, the principle surfactants are the dodecyl benzene sulfonates, the fatty alcohol sulfates, the petroleum sulfonates, sulfonated tallow, the alkyl phenol polyglycol ethers, glycerol monostearate, coconut oil amides and the sulfonated fatty amides. However, non-foaming surfactants are preferred.

In addition, bases other than sodium hydroxide may be used such as potassium hydroxide without departing from the scope of the invention. Further, various reducing agents which include potassium iodide and sodium arsenite may be employed in place of hydrogen peroxide. Also, any drying agent is useful in the invention which takes up the moisture present in the FDNE mixture so that it cannot react with the concentrated acid added in the preparation of FEFO. However, this compound must be inert and not interfere with the mixture except for the removal of water. Thus a salt such as calcium sulfate is an acceptable alternative to magnesium sulfate whereas calcium carbonate is not because it produces a basic solution.

The temperature at which the reaction described in Example I may be run varies from −20° C. to about 15° C. although a temperature range of −5–0° C. is preferred. On the other hand, the reaction of Example II may be run over the broad range of 0–100° C.

The pH of the reaction solution in Example I should be about 8 before the addition of acid. Example II, on the contrary, requires the use of concentrated acid to take up the water of reaction and thus force the equilibrium to favor the production of the formal. The acid preferred is "96%" sulfuric acid.

Obviously, numerous other modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. In the process for the preparation of 2-fluoro-2,2-dinitroethanol which comprises the step of
reacting fluorotrinitromethane with formaldehyde in water, in the presence of a base and in the presence of a reducing agent selected from the group consisting of hydrogen peroxide, potassium iodide and sodium arsenite at a temperature between −20° C. and about 15° C. the improvement comprising conducting said reaction in the presence of a surfactant selected from the group consisting of sodium p-toluene sulfonate, dodecyl benzene sulfonates, fatty alcohol sulfates, petroleum sulfonates, sulfonated tallow, alkyl phenol polyglycol ethers, glycerol monostearate coconut oil amides and sulfonated fatty amides.

2. The process according to claim 1 which includes the further steps of
extracting 2-fluoro-2,2-dinitroethanol with methylene chloride; and
recovering 2 - fluoro - 2,2 - dinitroethanol from said methylene chloride.

3. The process according to claim 1 wherein said reducing agent is hydrogen peroxide.

4. The process according to claim 1 wherein said surfactant is sodium p-toluene sulfonate.

5. The process according to claim 3 wherein the pH is about 8 and the surfactant is sodium p-toluene sulfonate.

References Cited

UNITED STATES PATENTS

| | | | |
|---|---|---|---|
| 2,999,118 | 9/1961 | Bachman et al. | 260—633 |
| 3,203,999 | 8/1965 | Gardner et al. | 260—633 |
| 3,316,292 | 4/1967 | Schaeffler | 260—633 XR |
| 3,388,147 | 6/1968 | Kamlet et al. | 260—633 XR |
| 3,446,857 | 5/1967 | Adolph | 260—633 |

HOWARD T. MARS, Primary Examiner

U.S. Cl. X.R.

260—615